US006990050B2

(12) United States Patent
Shiozaki et al.

(10) Patent No.: US 6,990,050 B2
(45) Date of Patent: Jan. 24, 2006

(54) OPTICAL DISK RECORDING AND REPRODUCING APPARATUS TO CONTROL THE LASER POWER TO AN OPTIMAL VALUE AND ENABLE STABLE RECORDING AND REPRODUCING OPERATIONS

(75) Inventors: Yoshihiko Shiozaki, Hamamatsu (JP); Tomoaki Hirai, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 517 days.

(21) Appl. No.: 09/964,087

(22) Filed: Sep. 26, 2001

(65) Prior Publication Data

US 2002/0041552 A1 Apr. 11, 2002

(30) Foreign Application Priority Data

Sep. 27, 2000 (JP) ...................................... 2000-294737

(51) Int. Cl.
*G11B 7/125* (2006.01)

(52) U.S. Cl. ................ 369/47.5; 369/59.11; 369/53.26

(58) Field of Classification Search ..... 269/47.5–47.52, 269/59.11, 53.26
See application file for complete search history.

(56) References Cited

U.S. PATENT DOCUMENTS

| | | | | | |
|---|---|---|---|---|---|
| 5,151,893 | A | * | 9/1992 | Yamasaki et al. | 369/59.11 |
| 5,495,463 | A | | 2/1996 | Akagi et al. | 369/113 |
| 5,949,747 | A | * | 9/1999 | Miyashita et al. | 369/53.26 |
| 6,292,448 | B1 | * | 9/2001 | Yoshida et al. | 369/53.27 |
| 6,359,847 | B1 | * | 3/2002 | Shimizu | 369/53.26 |
| 6,594,210 | B2 | * | 7/2003 | Kumagai | 369/47.17 |

FOREIGN PATENT DOCUMENTS

| | | |
|---|---|---|
| JP | 63121130 | 5/1988 |
| JP | 2005221 | 1/1990 |
| JP | 05-028495 | 2/1993 |
| JP | 06-236576 | 8/1994 |
| JP | 09-045982 | 2/1997 |
| JP | 2000-082230 | 3/2000 |

OTHER PUBLICATIONS

Japanese Patent Office Notice of Rejection—Japanese Application No. 294737/2000—Apr. 15, 2003.

Japanese Patent Office Notice of Rejection—Japanese Application No. 294737/2000—Sep. 9, 2003.

* cited by examiner

*Primary Examiner*—Hoa T. Nguyen
*Assistant Examiner*—Michael V. Battaglia
(74) *Attorney, Agent, or Firm*—Pillsbury Winthrop LLP

(57) ABSTRACT

An optical disk recording and reproducing apparatus operates in a read mode for controlling a laser driver to maintain a laser power at a target read level so as to read a signal from an optical disk, and operates in a write mode for controlling the laser driver to alternate the laser power between a target write level and a target bottom level comparative with the target read level so as to write a signal into the optical disk. In the write mode, a value obtained by sampling and holding the bottom level is set as the target value of a bottom level, and a bottom level control signal is outputted according to a difference between this target value and the detected value of the bottom level. Thus, the laser power control can be performed without any errors being generated even if an offset has occurred in the detected bottom power. Thus, the bottom laser power can be maintained constant.

8 Claims, 4 Drawing Sheets

PRIOR ART

OPTICAL DISK RECORDING AND REPRODUCING APPARATUS TO CONTROL THE LASER POWER TO AN OPTIMAL VALUE AND ENABLE STABLE RECORDING AND REPRODUCING OPERATIONS

BACKGROUND OF THE INVENTION

1. Field of the Invention

This invention relates to a laser output control for a optical disk apparatus of a CAV recording system designed to record information by optical laser power in an optical disk such as CD-R, CD-RW, CD-WO, MD, DVD, DRAW or the like.

2. Background Art

With regard to a DRAW disk and a rewritable optical disk, for example, a dye-containing recording material or the like is coated, and a record pit is formed thereon by irradiating the recording material with a laser light beam. To stably form the record pit on the optical disk under a constant condition, a laser diode (LD) driving current must be controlled such that always constant laser power can be obtained. As a recording waveform of the laser light, for example as shown in FIG. 3, a basic pattern is a rectangular wave form raised from a bottom level BP (=read level RP) to a write level WP for forming a record pit. The change of the read level and the bottom level adversely affect focusing and tracking servo gains. Also, variation of the write level affects the formation quality of the record pit. Thus, to realize a stable recording/reproducing operation, LD driving control must be performed such that the read level RP, the bottom level BP and the write level WP can always maintain respective target levels.

FIG. 4 is a block diagram showing the configuration of a laser output control unit for a conventional optical disk recording/reproducing apparatus designed to perform such LD driving control. A laser light from a laser diode (LD) 2 driven by a laser driving device 1 is irradiated to an optical disk for reading information written in the optical disk, and for writing information in the optical disk. The target value of the output power of the laser light in this case is equal to the read level RP of FIG. 3 in the reading mode, and equal to the bottom level BP or the write level WP of FIG. 3 in the write mode. A photodiode (PD) 3 receives a part of a reflected light from the optical disk or a part of the laser light irradiated to the optical disk, and converts the received light into an electric signal. A light signal outputted from this PD 3 is converted from a current signal into a voltage signal by an I/V converter 4, and is outputted as a laser output detecting signal I/VOUT. The laser output I/VOUT is supplied to a read/bottom power detecting circuit 5 and a write power detecting circuit 6. The read/bottom power detecting circuit 5 detects s read power RP by sampling and holding the laser output detecting signal I/VOUT at a predetermined time interval on the reading mode, and detects a bottom power BP by sampling and holding the bottom part of the rectangular wave of the laser output detecting signal I/VOUT on the writing mode. The write power detecting circuit 6 detects a write power RP by sampling and holding the peak part of the rectangular wave of the laser output detecting signal I/VOUT on the writing mode. Sampling and holding timings at the read/bottom power detecting circuit 5 and the write power detecting circuit 6 are controlled by a laser power switching control unit 7 in accordance with an eight to fourteen modulation (EFM) signal representing a recording signal. Regarding a read/bottom power detecting signal R/BPD outputted from the read/bottom power detecting circuit 5, a read/bottom power target value R/BPRef is subtracted by a subtracter 8 to generate a read/bottom power control signal R/BPC, and this signal is supplied to A terminal side of a switching device 10. From a write power detecting signal WPD outputted from the write power detecting circuit 6, a write power target value WPRef is subtracted by a subtracter 9 to generate a write power control signal WPC, and this signal is supplied to B terminal side of the switching device 10. The switching device 10 is subjected to switching control by the laser power switching control unit 7 in accordance with the EFM signal, and either of the control signals R/BPC and WPC are selectively supplied to the laser driving device 1.

FIG. 5 is a time chart showing the operation of the conventional laser output control apparatus constructed in the foregoing manner. During the reading mode, the laser output control apparatus controls the laser driving device 1 such that the switching device 10 is fixed to the A terminal side, and laser power can be set to a constant read level RP, which is lowered for forming no pits on the disk. During the writing mode, the laser output control apparatus controls the laser driving device 1 such that at a pit portion, the switching device 10 is connected to the B terminal side, and the pit can be formed on the disk by raising the laser power to the write level. At a land portion, the switching device 10 is connected to the A terminal side, and a constant bottom level BP lowered for forming no pits on the disk can be set.

The bottom level BP on the write mode is obtained by sampling and holding the bottom part of the rectangular wave of the laser output detecting signal I/VOUT. However, as the recording rate is increased by 10 times or 12 times, the response speed of the detection system including the PD3 cannot follow and, as indicated by the dotted-line portion of the enlarged view of the laser output detecting signal I/VOUT in FIG. 5, waveform deformation occurs in the laser output detecting signal I/VOUT. If this portion is sampled and held, then offset occurs between the detecting signal R/BRD of the read/bottom power detecting circuit 5 and an actual bottom level. Such offset causes the laser driving device 1 to lower a bottom level during the recording. Consequently, a laser driving signal R/BP becomes lower than an optimal value. This offset is also affected by the write power and, if the write power is increased following the increase of the recording rate, the offset is increased more.

If the bottom level is lowered as described above, then focussing and tracking gains are changed, thereby bringing about the problem of unstable servo. Further, if the offset is large, the laser power may disappear. The quantity of such offset varies depending on the write power and the device configuration, and thus a perfect correction has been impossible by simply providing a predetermined amount of a correction value to a control target value.

SUMMARY OF THE INVENTION

The present invention is made to solve the foregoing problems, and objects of the invention are to provide an optical disk recording apparatus, capable of controlling the laser power to an optimal value, and enabling a stable recording/reproducing operation to be performed, even if offset occurs in a detected level.

The inventive optical disk recording and reproducing apparatus is operative in a read mode for controlling a laser driver to maintain a laser power at a target read level so as to read a signal from an optical disk, and is operative in a write mode for controlling the laser driver to alternate the laser power between a target write level and a target bottom level comparative with the target read level so as to write a signal into the optical disk. In the inventive apparatus, a first detector is operative in the read mode for detecting a read level of the laser power, and is operative in the write mode for detecting a bottom level of the laser power. A first controller is operative in the read mode for outputting a read level control signal according to a difference between the detected read level and the target read level, and is operative in the write mode for outputting a bottom level control signal according to a difference between the detected bottom level and the target bottom level. A second detector is operative in the write mode for detecting a write level of the laser power. A second controller is operative in the write mode for outputting a write level control signal according to a difference between the detected write level and the target write level. A third controller is operative in the read mode for providing the read level control signal to the laser driver, and is operative in the write mode for alternately providing the write level control signal and the bottom level control signal to the laser driver in accordance with the signal to be written into the optical disk. The first controller comprises a first sample & hold section that samples the read level control signal immediately before the read mode is switched to the write mode and that holds the sampled read level control signal after the read mode is switched to the write mode, a second sample & hold section that samples the detected bottom level immediately after the read mode is switched to the write mode and then holds the sampled bottom level, and a control section that outputs the sampled and held read level control signal as a bottom level control signal immediately after the read mode is switched to the write mode, and subsequently outputs another bottom level control signal according to a difference between the detected bottom level and the target bottom level which is given in the form of the sampled and held bottom level.

Preferably, the first controller memorizes the sampled and held bottom level for recurrent use thereof as the target bottom level. Further, the first controller corrects the target bottom level which is given in the form of the sampled and held bottom level in accordance with a past write level of the laser power detected when the bottom level is sampled and a current write level of the laser power detected in the write mode.

The inventive method is designed for controlling an optical recording and reproducing apparatus which is operative in a read mode for controlling a laser driver to maintain a laser power at a target read level so as to read a signal from an optical disk, and which is operative in a write mode for controlling the laser driver to alternate the laser power between a target write level and a target bottom level comparative with the target read level so as to write a signal into the optical disk. The inventive method is carried out by the steps of detecting a read level of the laser power in the read mode to generate a read level control signal according to a difference between the detected read level and the target read level, detecting a write level and a bottom level of the laser power in the write mode to generate a write level control signal according to a difference between the detected write level and the target write level, and to generate a bottom level control signal according to a difference between the detected bottom level of the laser power and the target bottom level, dividing a period of the write mode into a hold period immediately after the read mode is switched to the write mode and a servo period subsequent to the hold period, providing the read level control signal, which is sampled and held immediately before the read mode is switched to the write mode, to the laser driver in the hold period, sampling a bottom level detected in the hold period, and setting the sampled bottom level to the target bottom level for the servo period.

According to the invention, in the write mode, a value obtained by sampling and holding the bottom level is set as the target value of the bottom level, and the bottom level control signal is outputted according to a difference between this target value and the detected value of the bottom level detected by the read/bottom level detecting means. Thus, the laser power control can be performed without any errors being generated even if offset has occurred in the detected bottom power. Thus, the bottom laser power can be maintained constant.

DESCRIPTION OF THE PREFERRED EMBODIMENTS

Figure 1:
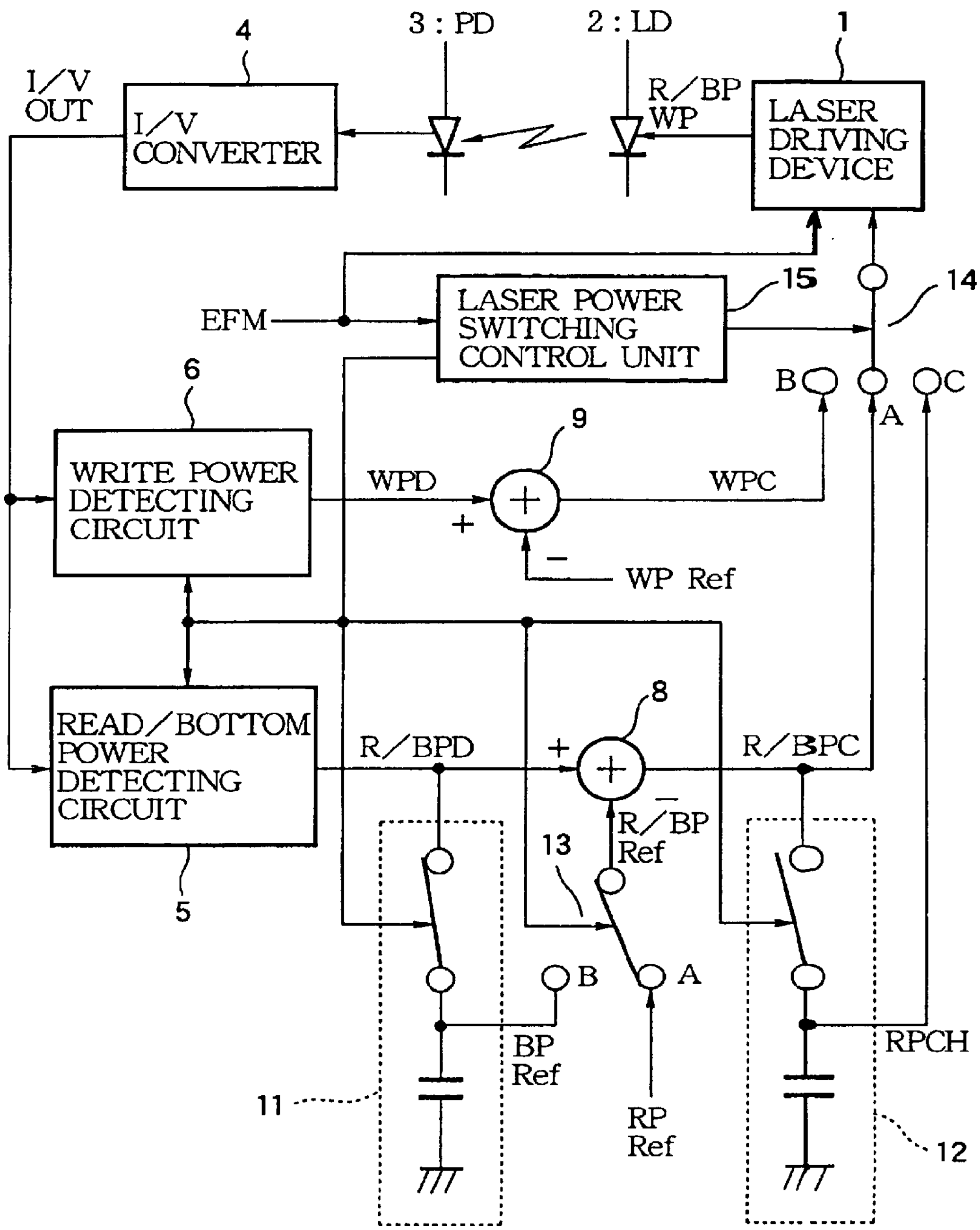
FIG. 1 is a block diagram showing a laser output control unit of an optical disk recording/reproducing apparatus according to an embodiment of the invention.
Figure 3:
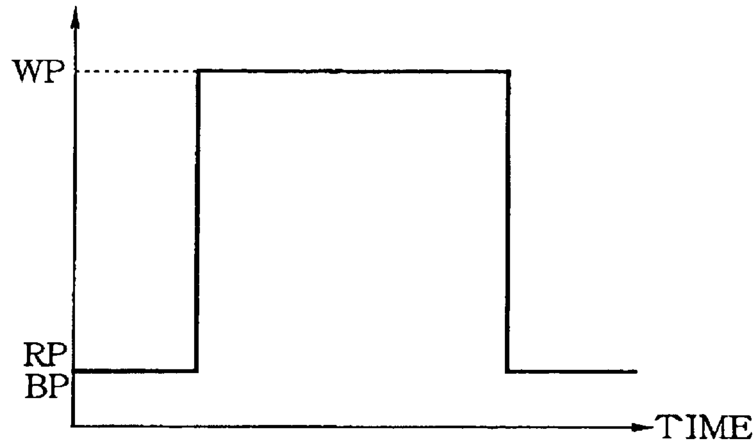
FIG. 3 is a view illustrating read power, bottom power and write power.
Figure 4:
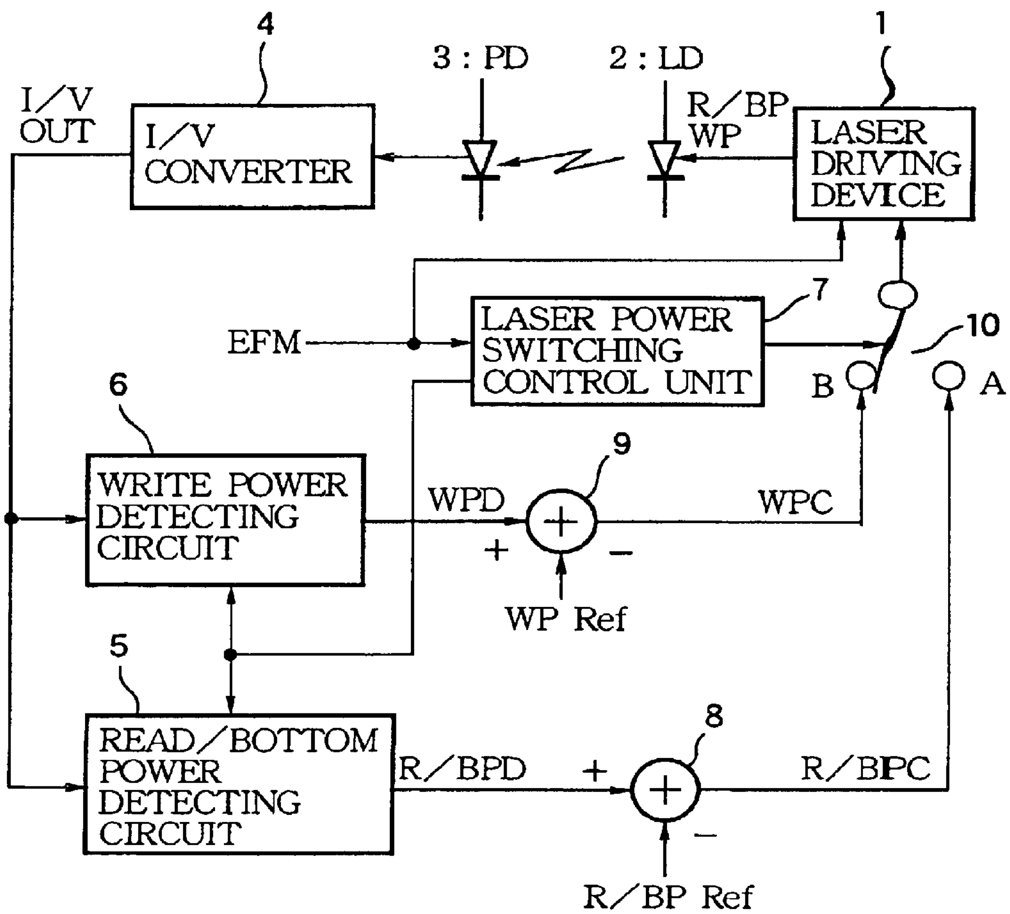
FIG. 4 is a block diagram showing a laser output control unit of a conventional optical disk recording/reproducing apparatus.
Figure 5:
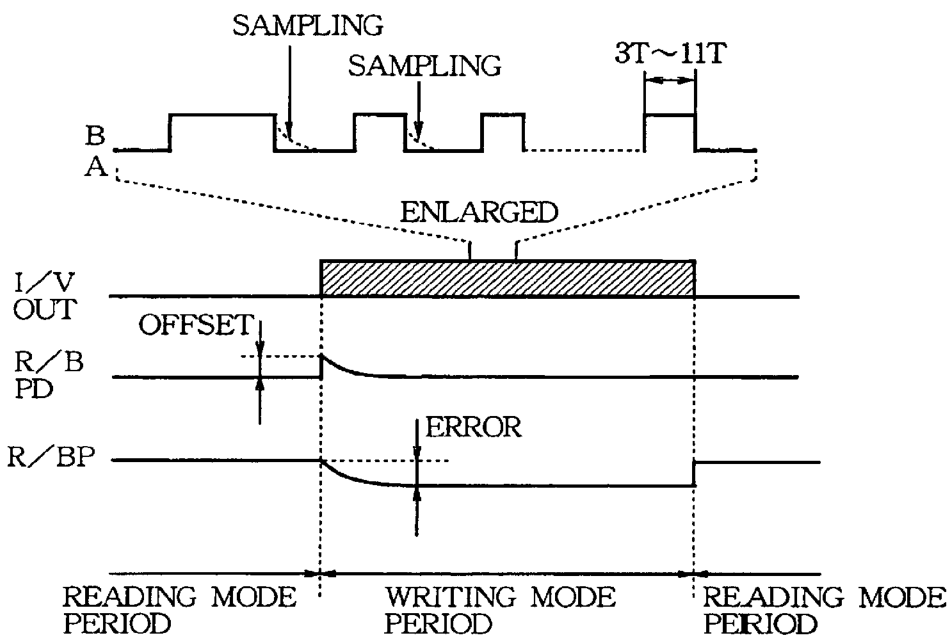
FIG. 5 is a timing chart showing an operation of the conventional apparatus.

Next, preferred embodiments of the present invention will be described with reference to the accompanying drawings. FIG. 1 is a block diagram showing the configuration of a laser output control unit for an optical disk recording and reproducing apparatus according to an embodiment of the invention. In FIG. 1, a laser light from a laser diode (LD) 2 driven by a laser driving device 1 is irradiated to an optical disk for reading information written in the optical disk, and for writing information in the optical disk. The target value of the output power of the laser light in this case is equal to the read level RP of FIG. 3 in the reading mode, and equal to the bottom level BP or the write level WP of FIG. 3 in the write mode. A photodiode (PD) 3 receives a part of a reflected light from the optical disk or a part of the laser light irradiated to the optical disk, and converts the received light into an electric signal. A light signal outputted from this PD 3 is converted from a current signal into a voltage signal by an I/V converter 4, and is outputted as a laser output detecting signal I/VOUT. The laser output I/VOUT is supplied to a read/bottom power detecting circuit 5 and a write power detecting circuit 6. The read/bottom power detecting circuit 5 detects a read power RP by sampling and holding the laser output detecting signal I/VOUT at a predetermined time interval on the reading mode, and detects a bottom power BP by sampling and holding the bottom part of the rectangular wave of the laser output detecting signal I/VOUT on the writing mode. The write power detecting circuit 6 detects a write power RP by sampling and holding the peak part of the rectangular wave of the laser output detecting signal I/VOUT on the writing mode. Sampling and holding timings at the read/bottom power detecting circuit 5 and the write power detecting circuit 6 are controlled by a laser power switching control unit 15 in accordance with an eight to fourteen modulation (EFM) signal representing a recording signal. Regarding a read/bottom power detecting signal R/BPD outputted from the read/bottom power detecting circuit 5, a read/bottom power target value R/BPRef is subtracted by a subtracter 8 to generate a read/bottom power control signal R/BPC, and this signal is supplied to a switching device 14. From a write power detecting signal WPD outputted from the write power detecting circuit 6, a write power target value WPRef is subtracted by a subtracter 9 to generate a write power control signal WPC, and this signal is supplied to the switching device 14.

This laser output control apparatus includes two sampling and holding circuits 11 and 12. The first sampling and holding circuit 11 is provided to store a target value of the bottom level. The sampling and holding circuit 11 samples a read/bottom power detecting signal R/BPD outputted from the read/bottom power detecting circuit 5 in the specified initial period (bottom holding period) of the write mode based on control from the laser power switching control unit 15, and holds this sampled signal in the following write mode period (bottom holding period). The held value of this sampling and holding circuit 11 is supplied as the target value BPRef of the bottom power to B terminal side of a switching device 13. A read power target value RPRef of the laser power has been supplied to A terminal side of the switching device 13. The switching device 13 switches these target values BPRef and RPRef, and supplies the read/bottom power target value R/BPRef to the subtracter 8.

On the other hand, the sampling and holding circuit 12 is provided to store a bottom power control signal. The sampling and holding circuit 12 samples a read/bottom power control signal R/BPC outputted from the subtracter 8 immediately before transition to the write mode, and holds the sampled signal after the transition to the write mode, based on control from the laser power switching control unit 15.

The switching device 14 includes A, B and C terminals, and receives the read/bottom power control signal R/BPC outputted from the subtracter 8 to the A terminal; the write power control signal WPC outputted from the subtracter 9 to the B terminal; and a holding value RPCH of a sampling and holding circuit 12 to the C terminal. These signals are switched based on control from the laser power switching control unit 15, and supplied to the laser driving device 1. Here, the first controller or read/bottom level control signal outputting means of the invention is composed of the subtracter 8, the sampling and holding circuits 11 and 12, and the switching device 13.

Figure 2:
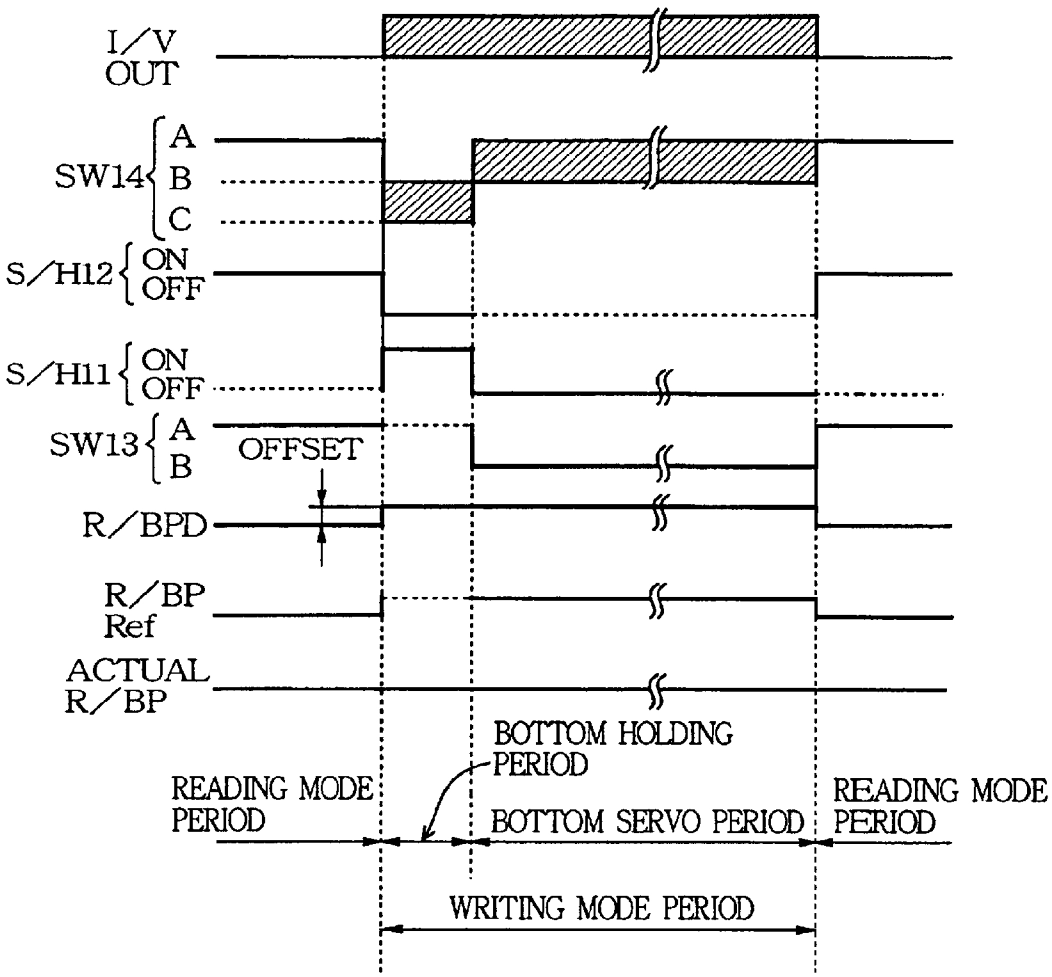
FIG. 2 is a timing chart showing an operation of the inventive apparatus.

FIG. 2 is a timing chart illustrating the operation of the laser output control apparatus constructed in the foregoing manner. In the reading mode period, the switching devices 13 and 14 are fixed to the A terminal, and the sampling and holding circuit 12 is set in a sampling state (switch ON). As a result, the laser driving device 1 for driving the LD 2 is controlled such that the power of a laser light emitted from the LD 2 can be set equal to the read power target value RPRref having a level which is lowered for forming no pits on a disk.

A next write mode period is composed of an initial bottom holding period and a subsequent bottom servo period. In the bottom holding period, the sampling and holding circuit 11 is set in a sampling state (switch ON), and the sampling and holding circuit 12 is set in a holding state (switch OFF). The switching device 14 switches between a write power control signal supplied to the B terminal and a holding value RPCH supplied to the C terminal. Thus, as a bottom power control signal supplied to the laser driving device 1, the holding value RPCH of the sampling and holding circuit 12 equal to a read power control signal immediately before the entry to the write mode is used. Therefore, even if an offset occurs in the bottom level, the control signal for determining the bottom power is not changed in this period, and maintains a level similar to that in the reading mode period.

After the entry to the bottom servo period, the sampling and holding circuit 11 is set in a holding state (switch OFF), and the switching device 13 is switched to the B terminal side. Thus, servo control is applied to the read/bottom power detecting signal R/BPD containing the offset by using the target value BPRef of the bottom power. Accordingly, since the offset is included similarly in both of the detected and target values, laser power control is executed in a state where the offset has been removed from the read/bottom power control signal R/BPC. The switching device 14 switches the A and B terminals with each other in the bottom servo period, and feedback control of the bottom and write levels is executed.

Thus, according to the inventive laser output control apparatus, in the bottom holding period, the read power control voltage of the reading mode period is continuously applied to the LD 2, and thus an open loop is formed. However, this bottom holding period is a relatively short time, because it is only necessary to set a time for sampling the initial bottom power of the write mode, and the outputted bottom laser power of the LD 2 is equal to that of the reading mode. Then, the detected bottom power value of the bottom holding period becomes a target voltage when the bottom power having a level equal to that of the reading mode is outputted. Thus, no errors occur even if an offset occurs in the bottom power detected by the read/bottom power detecting circuit 5, and control can be performed to maintain the bottom power constant.

The invention should not be limited to the foregoing embodiment. For example, it is not necessary to set the bottom holding period for all the write mode sessions, and the target value of the bottom level, once gained, may be used for the subsequent write mode sessions. In this case, the target bottom value may be obtained during test recording for obtaining an optimal power in the test area of a power calibration area (PCA), and this target value may be used during recording in the program area. In this case, the target value of a bottom level in a current write mode may be properly corrected based on a write level of the current recording and another write level observed when a value to be a target value of the bottom level is sampled.

As described above, according to the present invention, in the write mode period, a value obtained by sampling and holding the bottom level is used as the target value of the bottom level, and a bottom level control signal is outputted in accordance with a difference between this target value and the detected value of the bottom level detected by the read/bottom level detecting means. As a result, without generating any errors even if an offset occurs in the detected bottom power, it is possible to perform control to maintain bottom power constant.

What is claimed is:

1. An optical disk recording and reproducing apparatus being operative in a read mode for controlling a laser driver to maintain a laser power at a target read level so as to read a signal from an optical disk, and being operative in a write mode for controlling the laser driver to alternate the laser power between a target write level and a target bottom level comparative with the target read level so as to write a signal into the optical disk, the apparatus comprising:

a first detector being operative in the read mode for detecting a read level of the laser power, and being operative in the write mode for detecting a bottom level of the laser power;

a first controller being operative in the read mode for outputting a read level control signal according to a difference between the detected read level and the target read level, and being operative in the write mode for outputting a bottom level control signal according to a difference between the detected bottom level and the target bottom level;

a second detector operative in the write mode for detecting a write level of the laser power;

a second controller operative in the write mode for outputting a write level control signal according to a difference between the detected write level and the target write level; and a third controller being operative in the read mode for providing the read level control signal to the laser driver, and being operative in the write mode for alternately providing the write level control signal and the bottom level control signal to the laser driver in accordance with the signal to be written into the optical disk, wherein the first controller comprises a first sample and hold section that samples the read level control signal immediately before the read mode is switched to the write mode and that holds the sampled read level control signal after the read mode is switched to the write mode, a second sample and hold section that samples the detected bottom level immediately after the read mode is switched to the write mode and then holds the sampled bottom level, and a control section that outputs the sampled and held read level control signal as a bottom level control signal immediately after the read mode is switched to the write mode, and subsequently outputs another bottom level control signal according to a difference between the detected bottom level and the target bottom level which is given in the form of the sampled and held bottom level.

2. The optical disk recording and reproducing apparatus according to claim 1, wherein the first controller memorizes the sampled and held bottom level for recurrent use thereof as the target bottom level.

3. The optical disk recording and reproducing apparatus according to claim 1, wherein the first controller corrects the target bottom level which is given in the form of the sampled and held bottom level in accordance with a past write level of the laser power detected when the bottom level is sampled and a current write level of the laser power detected in the write mode.

4. A method of controlling an optical recording and reproducing apparatus which is operative in a read mode for controlling a laser driver to maintain a laser power at a target read level so as to read a signal from an optical disk, and which is operative in a write mode for controlling the laser driver to alternate the laser power between a target write level and a target bottom level comparative with the target read level so as to write a signal into the optical disk, the method comprising the steps of:

detecting a read level of the laser power in the read mode to generate a read level control signal according to a difference between the detected read level and the target read level;

detecting a write level and a bottom level of the laser power in the write mode to generate a write level control signal according to a difference between the detected write level and the target write level, and to generate a bottom level control signal according to a difference between the detected bottom level of the laser power and the target bottom level;

dividing a period of the write mode into a hold period immediately after the read mode is switched to the write mode and a servo period subsequent to the hold period;

providing the read level control signal, which is sampled and held immediately before the read mode is switched to the write mode, to the laser driver in the hold period;

sampling a bottom level detected in the hold period; and setting the sampled bottom level to the target bottom level for the servo period.

5. An optical disk recording and reproducing apparatus being operative in a read mode for controlling a laser driver to maintain a power of a laser beam at a target read power level so as to read a signal from the optical disk, and being operative in a write mode for controlling the laser driver to alternate the power of the laser beam between a target write power level and a target bottom power level so as to write a signal into the optical disk, the apparatus comprising:

a first detector being operative in the read mode for detecting a read power level of the laser beam, and being operative in the write mode for detecting a bottom power level of the laser beam;

a first controller being operative in the read mode for outputting a read power level control signal according to a difference between the detected read power level and the target read power level; and being operative in the write mode for outputting a bottom power level control signal according to a difference between the detected bottom power level and the target bottom power level;

a second detector operative in the write mode for detecting a write power level of the laser beam;

a second controller operative in the write mode for outputting a write power level control signal according to a difference between the detected write power level and the target write power level; and a third controller being operative in the read mode for providing the read power level control signal to the laser driver, and being operative in the write mode for alternatively providing the write power level control signal and the bottom power level control signal to the laser driver in accordance with the signal to be written into the optical disk, wherein the first controller comprises a first sample and hold section that samples the read power level control signal immediately before the read mode is switched to the write mode and that holds the sampled read power level control signal after the read mode is switched to the write mode, a second sample and hold section that samples the detected bottom power level in an initial period of the write mode immediately after the read mode is switched to the write mode and then holds the sampled bottom power level in a remaining period of the write mode, and a control section that outputs the sampled and held read power level control signal as a bottom power level control signal in the initial period of the write mode, and subsequently sets the sampled and held bottom power level as the target bottom power level in the remaining period of the write mode.

6. The optical disk recording and reproducing apparatus according to claim 5, wherein the first controller memorizes the sampled and held bottom power level for recurrent use thereof as the target bottom power level.

7. The optical disk recording and reproducing apparatus according to claim 5, wherein the first controller corrects the target bottom power level, based on a past write power level of the laser beam detected when the bottom power level is sampled, a current write power level of the laser beam detected in the write mode.

8. A method of controlling an optical recording and reproducing apparatus which is operative in a read mode for controlling a laser driver to maintain a power of a laser beam at a target read power level so as to read a signal from an optical disk, and which is operative in a write mode for controlling the laser driver to alternate the power of the laser beam between a target write power level and a target bottom power level comparative with the target read power level so as to write a signal into the optical disk, the method comprising the steps of:

detecting a read power level of the laser beam in the read mode to generate a read power level control signal according to a difference between the detected read power level and the target read power level;

detecting a write power level and a bottom power level of the laser beam in the write mode to generate a write power level control signal according to a difference between the detected write power level and the target write power level, and to generate a bottom power level control signal according to a difference between the detected bottom power level of the laser beam and the target bottom power level;

dividing a period of the write mode into a hold period immediately after the read mode is switched to the write mode and a servo period subsequent to the hold period;

providing the read power level control signal, which is sampled immediately before the read mode is switched to the write mode, to the laser driver in the hold period;

sampling a bottom power level detected in the hold period; and setting the sampled bottom power level to the target bottom power level for the servo period.

* * * * *